`US010129174B2`

United States Patent
Baughman et al.

(10) Patent No.: US 10,129,174 B2
(45) Date of Patent: *Nov. 13, 2018

(54) ADJUSTING CLOUD RESOURCE ALLOCATION

(71) Applicant: International Business Machines Corporation, Armonk, NY (US)

(72) Inventors: Aaron K. Baughman, Silver Spring, MD (US); Brian M. O'Connell, Cary, NC (US); Stefan Van Der Stockt, Johannesburg (ZA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,306

(22) Filed: Nov. 16, 2017

(65) Prior Publication Data
US 2018/0077083 A1 Mar. 15, 2018

Related U.S. Application Data

(63) Continuation of application No. 14/294,663, filed on Jun. 3, 2014, now Pat. No. 9,882,836.

(51) Int. Cl.
*H04L 12/911* (2013.01)
(52) U.S. Cl.
CPC .................. *H04L 47/823* (2013.01)
(58) Field of Classification Search
CPC .................................................. H04L 47/823
See application file for complete search history.

(56) References Cited

U.S. PATENT DOCUMENTS

| | | | | |
|---|---|---|---|---|
| 7,581,008 | B2 * | 8/2009 | Zhang | H04L 67/1006 703/2 |
| 7,676,569 | B2 * | 3/2010 | Barnett | G06Q 10/04 709/224 |
| 8,271,643 | B2 * | 9/2012 | Barnett | G06Q 10/06 709/224 |
| 8,621,080 | B2 * | 12/2013 | Iyoob | G06F 9/5061 709/226 |

(Continued)

OTHER PUBLICATIONS

Appendix P, 2017.

*Primary Examiner* — Joe Chacko
(74) *Attorney, Agent, or Firm* — Garg Law Firm, PLLC; Christopher K. McLane

(57) ABSTRACT

In a multi-tiered simulation configuration, a combination of predictive models is executed such that each tier in the multi-tiered simulation configuration executes at least one predictive model to produce a corresponding set of predicted events, and a predicted event from a first tier in the configuration forms an input to a next tier in the configuration. Using a subset of a selected set of predicted events outputted from a corresponding selected tier in the multi-tiered simulation configuration, a set of features is extracted, each feature in the set of features having an effect on an outcome of the simulated process. The set of features is used in a demand level prediction model to predict a threshold demand, wherein reaching the threshold demand in an actual utilization of a computing resource is indicative of a likelihood of an unforeseen rise in a demand for the computing resource after a period.

18 Claims, 6 Drawing Sheets

(56) References Cited

U.S. PATENT DOCUMENTS

| | | | | |
|---|---|---|---|---|
| 2013/0138816 A1* | 5/2013 | Kuo | ................... | G06F 9/5011 |
| | | | | 709/226 |
| 2013/0174149 A1* | 7/2013 | Dasgupta | .............. | G06F 9/5072 |
| | | | | 718/1 |
| 2015/0244645 A1* | 8/2015 | Lindo | ................... | H04L 47/823 |
| | | | | 709/224 |

* cited by examiner

ADJUSTING CLOUD RESOURCE ALLOCATION

TECHNICAL FIELD

The present invention relates generally to a method, system, and computer program product for allocating resources in a cloud computing environment. More particularly, the present invention relates to a method, system, and computer program product for adjusting cloud resource allocation using n-tier simulation to predicatively manage increased demand patterns not previously seen.

BACKGROUND

A predictive model (forecasting model, autoregressive model) is a software-implemented model of a system, process, or phenomenon, usable to forecast a value, output, or outcome expected from the system, process, or phenomenon. The system, process, or phenomenon that is modeled is collectively and interchangeably referred to hereinafter as a "process" unless specifically distinguished where used.

A simulation is a method of computationally looking ahead in the future of the execution of the process to predict one or more events that can be expected to occur in the process at that future time. A predicted event is a value, output, or outcome of the process at the end of a look-ahead period configured in the simulation.

A variable that affects an outcome of a process is called a feature. A predicted event or an outcome of a process is dependent upon, affected by, or otherwise influenced by a set of one or more features. A feature can be independent, to wit, independent of and not affected by other features participating in a given model. A feature can be dependent upon a combination of one or more other independent or dependent features.

A predictive model has to be trained before the model can reliably predict an event in the future of the process with a specified degree of probability or confidence. Usually, but not necessarily, the training data includes past or historical outcomes of the process. The training process adjusts a set of one or more parameters of the model.

Time series forecasting uses one or more forecasting models to regress on independent features to produce a dependent feature. For example, if Tiger Woods has been playing golf very quickly, the speed of play is an example of an independent feature. A forecasting model regresses on historical data to predict the future play rates. The future play rate is a dependent feature.

Cloud computing is one of the emerging technologies that enables flexible and efficient computing. Cloud computing offers an on-demand model for computing that reduces, or in some cases, completely avoids the hardware and software maintenance costs for an end user of the computing services.

One model of cloud computing provides a user with a complete setup on which to execute the user's application or workload. Such a model provides a facility to execute a workload without providing the user with control over the configuration of the data processing environment.

Another model of cloud computing provides the user with a data processing environment per the user's request. Such a model provides to the user "machine time" on a data processing system of the user's desired configuration. Typically, the data processing environment in such a model takes the form of virtual machines (VMs) created according to a user-provided specification and allocated to the user for the duration of the user's workload.

Regardless of how offered, cloud computing service models are expected to remain responsive to changing load conditions. Furthermore, many cloud computing services are contractually required to provide at least threshold levels of performance and reliability.

SUMMARY

The illustrative embodiments provide a method, system, and computer program product for adjusting cloud resource allocation using n-tier simulation. An embodiment includes a method which executes, in a multi-tiered simulation configuration, a combination of predictive models such that each tier in the multi-tiered simulation configuration executes at least one predictive model to produce a corresponding set of predicted events, wherein a predicted event from a first tier in the configuration forms an input to a next tier in the configuration; extracts, using a subset of a selected set of predicted events outputted from a corresponding selected tier in the multi-tiered simulation configuration, a set of features, each feature in the set of features having an effect on an outcome of the simulated process; and uses the set of features in a demand level prediction model to predict a threshold demand, wherein reaching the threshold demand in an actual utilization of a computing resource is indicative of a likelihood of an unforeseen rise in a demand for the computing resource after a period.

Another embodiment includes a computer program product for adjusting resource allocation in a cloud computing environment. The embodiment further includes one or more computer-readable tangible storage devices. The embodiment further includes program instructions, stored on at least one of the one or more storage devices, to execute the above-described method.

Another embodiment includes a computer system for adjusting resource allocation in a cloud computing environment. The embodiment further includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to execute the above-described method.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
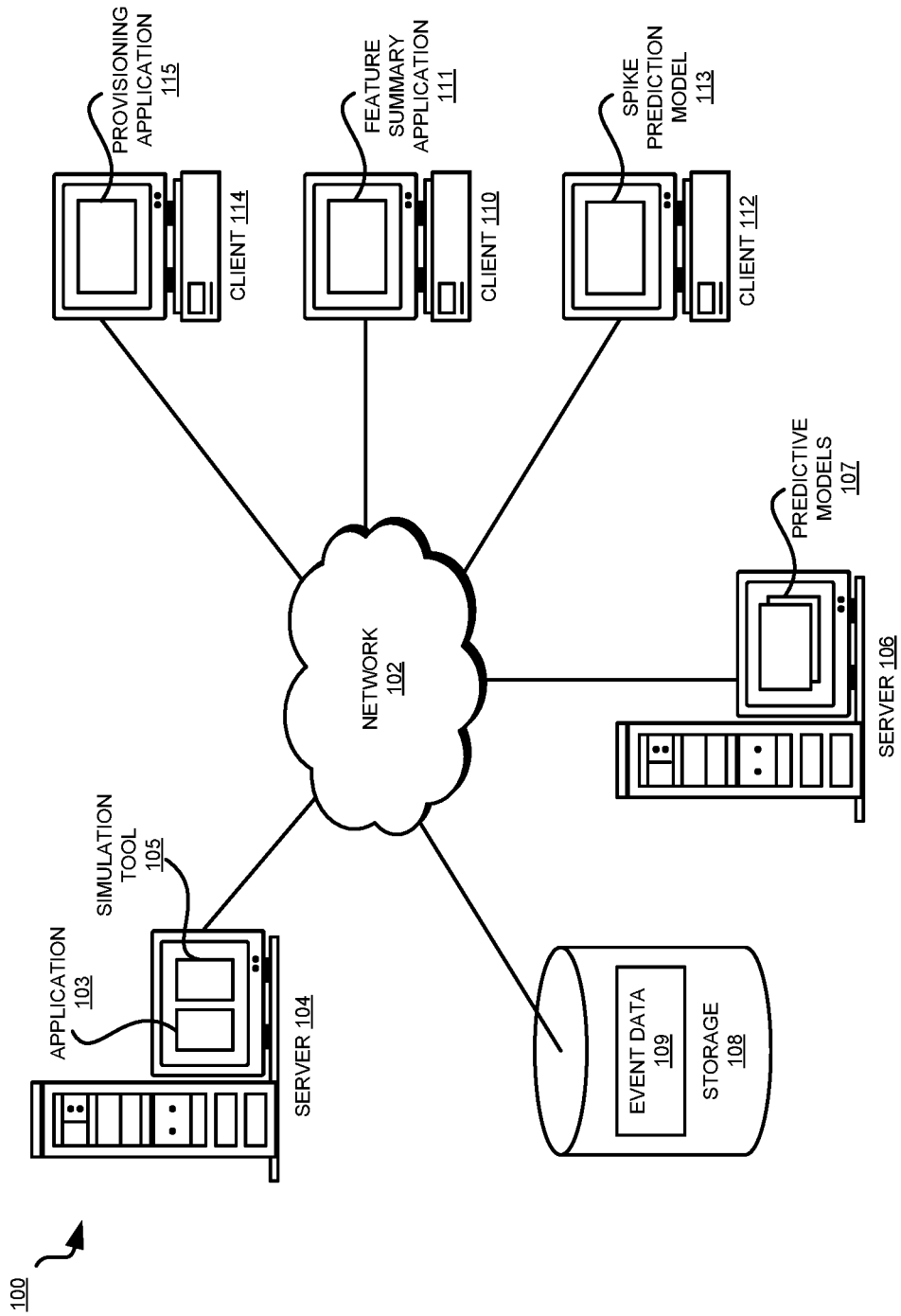
FIG. 1 depicts a block diagram of a network of data processing systems in which illustrative embodiments may be implemented.

The flexibility of using selected computing resources when they are needed, as a service, is a desirable feature of cloud computing that endears the cloud model to all types of users, including business enterprises, high power computing groups, and individual users.

The illustrative embodiments recognize that matching a cloud workload to a cloud resource pool is a difficult problem to solve. Existing techniques for cloud resource allocation focus on extrapolating the resource usage statistics of a workload to find resource usage patterns in the workload. These techniques record the resource needed or used in specific patterns and assign similar amounts or types of cloud resources to the workload when a previously seen pattern occurs in the workload.

The illustrative embodiments recognize that this technique of cloud resource allocation is unsuitable and insufficient to address anomalies in cloud resource usage patterns based on the area of application that the cloud is actually servicing. The existing techniques of cloud resource allocation fail to timely match cloud resources to the expected demand for which no usage patterns exist yet.

For example, an application may be related to serving a website and providing news and notifications about sporting events, such as a golf tournament or a tennis tournament. Generally, no two tournaments are alike, and a large number of reasons affect why one tournament will play out differently from another. Depending on who is playing, how they are playing, weather conditions, ground conditions, spectators, location, and many other reasons, the resource demands of an application serving a particular tournament can change in a manner not seen before in a previous tournament.

To address such fluctuations in resource demands, the existing cloud resource allocation methods are inadequate. A method employing advanced predictive analytics on the future events is therefore needed.

The illustrative embodiments used to describe the invention generally address and solve the above-described problems and other problems related to cloud resource allocation in demand fluctuations scenarios that have not previously been seen or are highly variable. The illustrative embodiments provide a method, system, and computer program product for adjusting cloud resource allocation using n-tier simulation.

The illustrative embodiments describe a preventative technology that includes a tiered simulation to produce a likelihood of spikes in resource demand and an expected measurement of the spikes that a given cloud environment will have to support while servicing certain applications.

A cloud according to the illustrative embodiments includes an autonomic component. The autonomic component of the cloud allows the cloud to recognize problem conditions, and autonomously self-heal from the problem, or to proactively address or avoid the problem condition. The autonomic component of the cloud allows the cloud to adjust and to self-correct anomalous behavior. An event prediction method according to an embodiment enables the cloud or a system therein to proactively configure resources in order to avoid problems, such as resource demand spikes, before they develop.

According to an embodiment, a tiered simulation comprises any number of tiers (n-tier). The n-tiered simulation starts from a base simulation, which takes as input the available facts under the present service conditions in servicing a resource consumer, e.g., an application, in the cloud. The base simulation can use any suitable predictive model to produce a set of first level predicted events.

Each subsequent tier in the n-tier simulation allows progressively farther look-ahead in the future of servicing the resource consumer from the first level predicted events. For example, if the resource consumer is the example application that services tennis tournaments as described earlier, a first tier simulation after the base simulation may be configured to produce a set of second level predicted events that are likely to unfold one hour into a tournament based on the set of first level predicted events as input. A second tier simulation after the first tier simulation may be configured to produce a set of third level predicted events that are likely to unfold forty-five minutes after the one hour into the tournament, based on the set of second level predicted events as input.

The base simulation and (n−1) tiers of simulations arranged in this manner comprise the n-tier simulation according to an embodiment. Continuing with the example, the (n−1)th tier simulation after the (n−2)th tier simulation may be configured to produce a set of n-th level predicted events that are likely to unfold much farther into the future of tournament, based on the set of (n−1)th level predicted events as input.

A tier of the n-tier simulation according to an embodiment can utilize a domain-dependent simulation, a domain-independent simulation, or a combination thereof. A domain-dependent simulation uses a predictive model that is trained with and uses process-specific data of the simulated process. A domain-independent simulation uses a predictive model that is trained with data from a variety of subject matter domains, and can use data from a variety of processes to produce predictions.

Consequently, a domain-dependent simulation often needs volumes of state data that is specific to the process being predicted, but also produces predictions that have a higher than a threshold level of confidence, to wit, higher than a threshold probability of occurring in the process. A domain-independent simulation in contrast needs significantly less amount of process-specific state data, but also produces predictions that have a lower than the threshold level of confidence or probability of occurring in the process.

An n-tier simulation according to an embodiment can combine domain-dependent and domain-independent simulations in same or different tiers. The n-tier simulation according to an embodiment increases the search space of the simulation. Thus, for each set of initial points (inputs), another set of points or predicted events (outputs) are created at each tier.

After the n-tier simulation, an embodiment extracts a set of features from the set of n-th level predicted events. An embodiment further summarizes the features, and their component variables.

Feature extraction operation of an embodiment summarizes future predicted states for input into a model. An embodiment increases the search space that will be summarized for a predictive model. The granularity of the simulated space is spliced into n-tiers, limited by the real time requirements of the system. The accuracy of the n-tier simulation is controlled by the degree of data dependency, by suitably mixing domain-independent and domain-dependent simulations in the various tiers.

An embodiment provides the feature summaries to a trained predictive model as input. The trained predictive model is a prediction model for predicting resource demand levels (resource demand amplitude) in the cloud. The trained predictive model produces as output a maximum amplitude of a spike condition, to wit, a spike threshold. The spike threshold is indicative of an impending condition that is likely to give rise to a spike in the resource demand. Further, the trained predictive model produces as another output, a confidence in the spike threshold, to wit, a probability that when the spike threshold is observed in resource demand, a spike or increase in the resource demand that exceeds the spike threshold will in fact occur in the cloud.

When a cloud computing environment is supported by a predictive cloud using an embodiment described herein, resources can be provisioned ahead of the time horizon to support loads that cannot be predicted looking at only the monitored resource statistics. An embodiment enables load predictions in such circumstances based on predicting events in the process that is being serviced by the cloud. In a manner of speaking, one or more embodiments when used in a cloud environment provide the cloud event-based prediction capabilities for reasoning under uncertainty and for provisioning resources in previously unseen demand situations.

The illustrative embodiments are described with respect to certain data, processes, predictions, events, features, variables, summaries, confidence levels, probabilities, thresholds, rates, structures, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments.

Additional or different advantages may be realized by specific illustrative embodiments. Furthermore, a particular illustrative embodiment may have some, all, or none of the advantages listed above.

Figure 2:
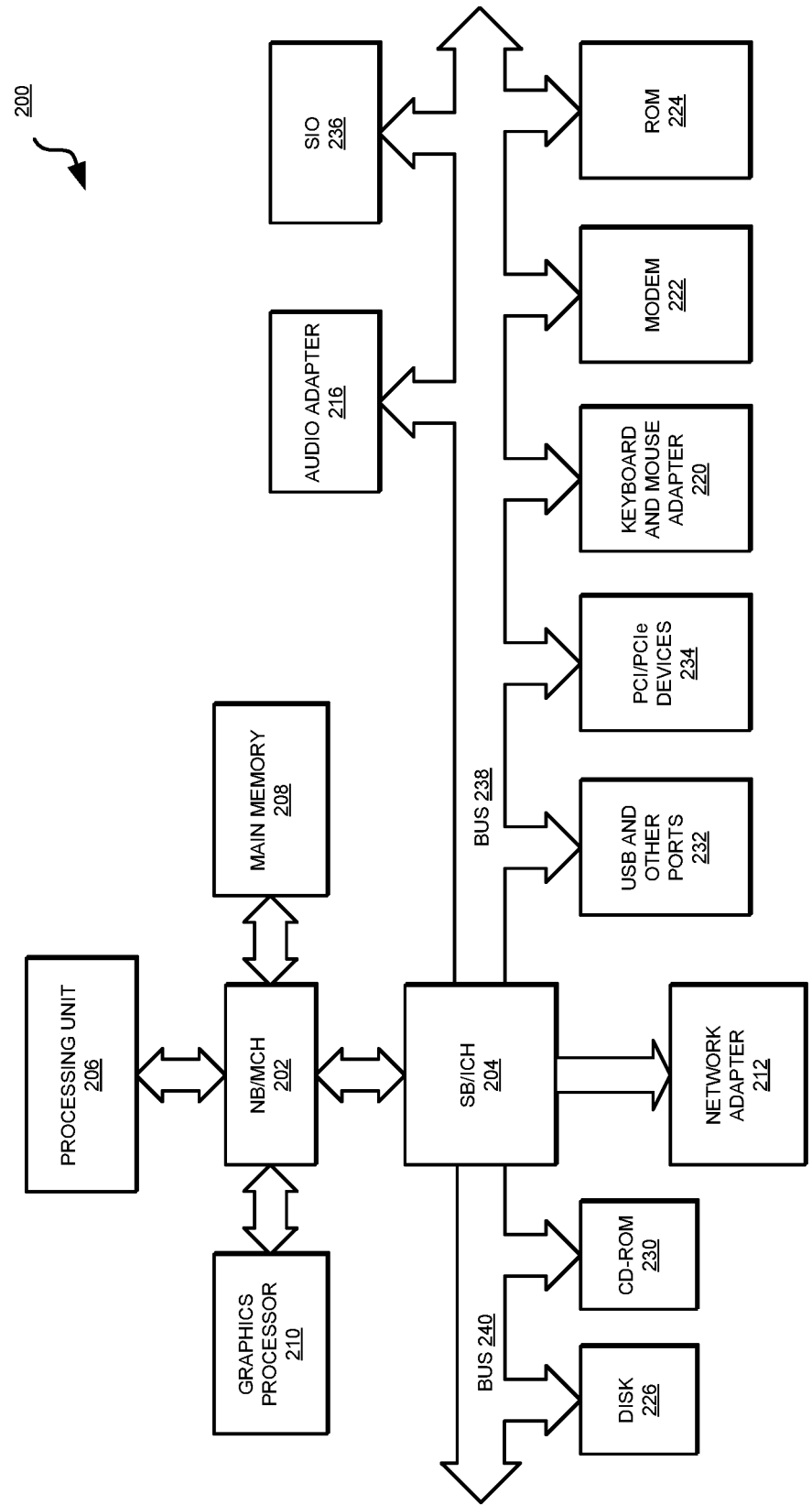
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. For example, Application 103 in server 104 implements an embodiment described herein. Simulation tool 105 in server 104 is any software tool capable of executing a simulation exercise using a predictive model, such as any of models 107. For example, an instance of simulation tool 105 can be configured to execute one predictive model 107 as the base simulation, another instance of simulation tool 105 can be configured to execute another predictive model 107, e.g., a domain-dependent model, as a tier in the n-tier simulation, and another instance of simulation tool 105 can be configured to execute another predictive model 107, e.g., a domain-independent model, as another tier in the n-tier simulation. Event data 109 comprises predicted events output from one or more tiers in the n-tier simulation according to an embodiment. Feature summary application 111 extracts the features from the predicted events and summarizes the extracted features in the manner of an embodiment. Spike prediction model 113 executes to produce a spike threshold and corresponding confidence as described elsewhere with respect to an embodiment. Application 103 is usable for configuring the various predictive models 107 for execution using simulation tool 105 in an n-tier simulation, invoking feature extraction and summary application 111 with the appropriate inputs, sending the output spike threshold to spike prediction model 113, using the output of spike prediction model 113 to perform resource allocation adjustments in cloud environment 100 using provisioning application 115 according to an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 103, simulation tool 105, predictive models 107, feature summary application 111, spike prediction model 113, and provisioning application 115 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may Include one or more processors or CPUs.

The depicted examples in FIGS. 1 and 2 and above-described examples are not meant to imply architectural limitations. For example, data processing system 200 also may be a tablet computer, laptop computer, or telephone device in addition to taking the form of a PDA.

Figure 3:
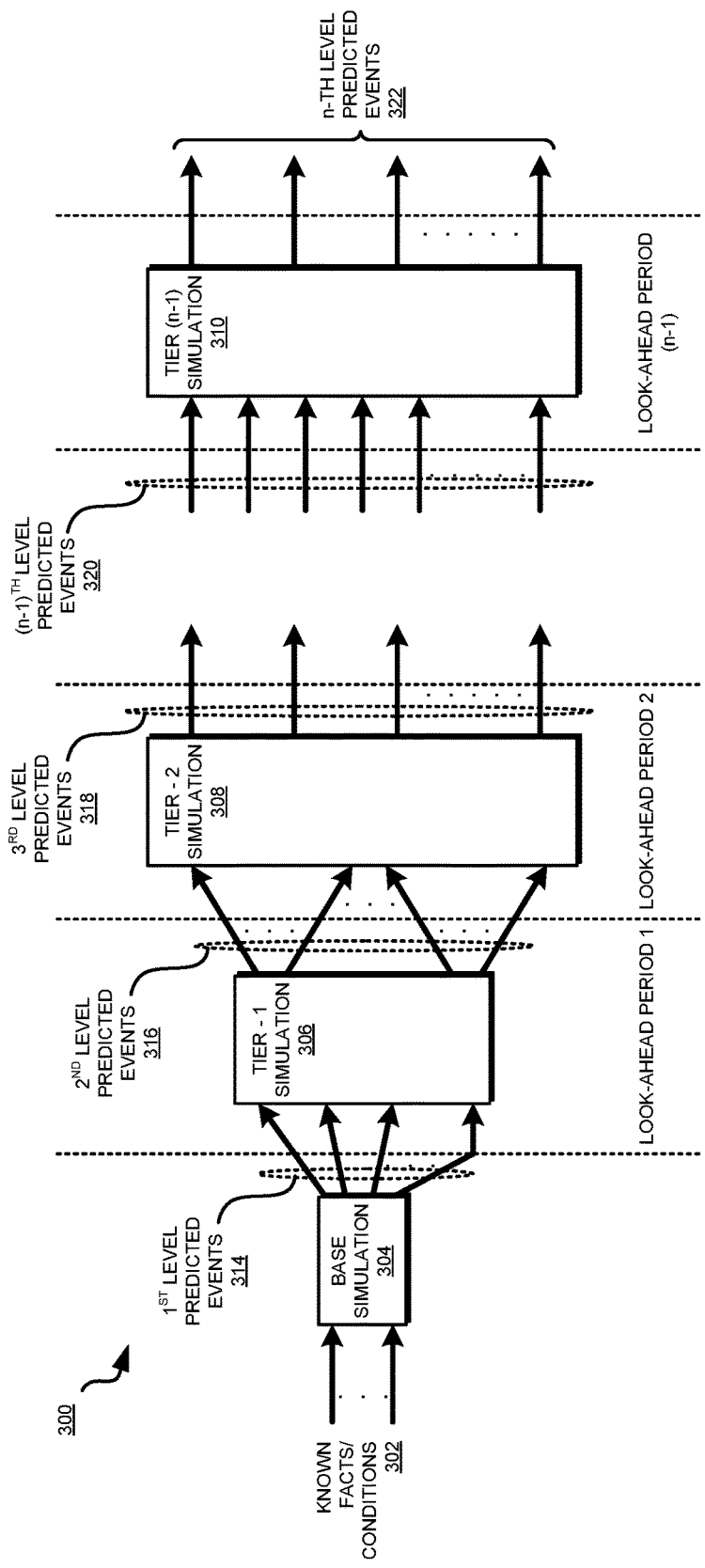
FIG. 3 depicts a block diagram of an example n-tier simulation configuration in accordance with an illustrative embodiment.

With reference to FIG. 3, this figure depicts a block diagram of an example n-tier simulation configuration in accordance with an illustrative embodiment. N-tier simulation 300 is configured in, by, or using application 103 in FIG. 1.

Known facts or conditions 302 are present conditions in a resource consumer process. Base simulation 304 comprises an instance of simulation tool 105 in FIG. 1 executing a suitable prediction model 107 in FIG. 1. Tier-1 simulation 306 comprises another instance of simulation tool 105 in FIG. 1 executing another suitable prediction model 107 in FIG. 1. Tier-2 simulation 308 comprises another instance of simulation tool 105 in FIG. 1 executing another suitable prediction model 107 in FIG. 1. Likewise, at the n-th tier of an n-tier simulation according to an embodiment, application 103 in FIG. 1 configures tier (n−1) simulation 310, which comprises another instance of simulation tool 105 in FIG. 1 executing another suitable prediction model 107 in FIG. 1.

Base simulation 304 accepts known facts 302 as input and outputs set 314 of 1-st level predicted events. Some or all of set 314 forms an input to tier-1 simulation 306, which outputs set 316 of 2-nd level predicted events. The predicted events in set 316 are predicted to exist in the resource consumer process after look-ahead period 1. Some or all of set 316 forms an input to tier-2 simulation 308, which outputs set 318 of 3-rd level predicted events. The predicted events in set 318 are predicted to exist in the resource consumer process after look-ahead periods 1 and 2. The n-tier simulation operation continues in a like manner up to tier (n−1) simulation 310, where set 320 of (n−1)th level of predicted events are predicted to exist in the resource consumer process after a total of look-ahead periods 1-thru-(n−2). Some or all of set 320 forms an input to tier (n−1) simulation 310, which outputs set 322 of n-th level predicted events. The predicted events in set 320 are predicted to exist in the resource consumer process after a total of look-ahead periods 1-thru-(n−1).

Note that while only one simulation is depicted at each tier, such depiction is not intended to be limiting on the illustrative embodiments. For example, more than one tier-1 simulations may be configured to execute using different subsets of set 314, within the scope of the illustrative embodiments. Other tiers may be similarly configured with multiple instances of simulations executing at those tiers in a similar manner.

Furthermore, different instances of simulations at a particular tier may execute using different predictive models within the scope of the illustrative embodiments. For example, one instance at tier-2 simulation 308 may execute using a domain-dependent predictive model, another instance at tier-2 simulation 308 may execute using a domain-independent predictive model, and yet another instance at tier-2 simulation 308 may execute using a domain-dependent predictive model and a domain-independent predictive model.

An instance of simulation at any particular tier can execute predictive models differentiated not only by their domain-dependence or domain-independence, but also by other differentiators within the scope of the illustrative embodiments. For example, tier-1 simulation 306 or an instance thereof may be a recall-oriented tier, executing a recall-oriented predictive model, and tier-2 simulation 308 or an instance thereof may be a precision-oriented tier, executing a precision-oriented predictive model. Predictive models 107 in FIG. 1 also include recall-oriented predictive models and precision-oriented precision models.

Recall is a fraction of relevant instances that are retrieved, and precision is the fraction of retrieved instances that are relevant. Precision can be seen as a measure of exactness or quality, whereas recall is a measure of completeness or quantity. Maximum precision indicates no false positives, and maximum recall indicates no false negatives.

Stated in terms of predicted events, a recall-oriented tier seeks to maximize in an output set of predicted events, predicting as many events that are relevant or related to the process being simulated. Stated in terms of predicted events, a precision-oriented tier seeks to maximize in an output set of predicted events, those predicted events that are relevant or related to the process being simulated.

Figure 4:
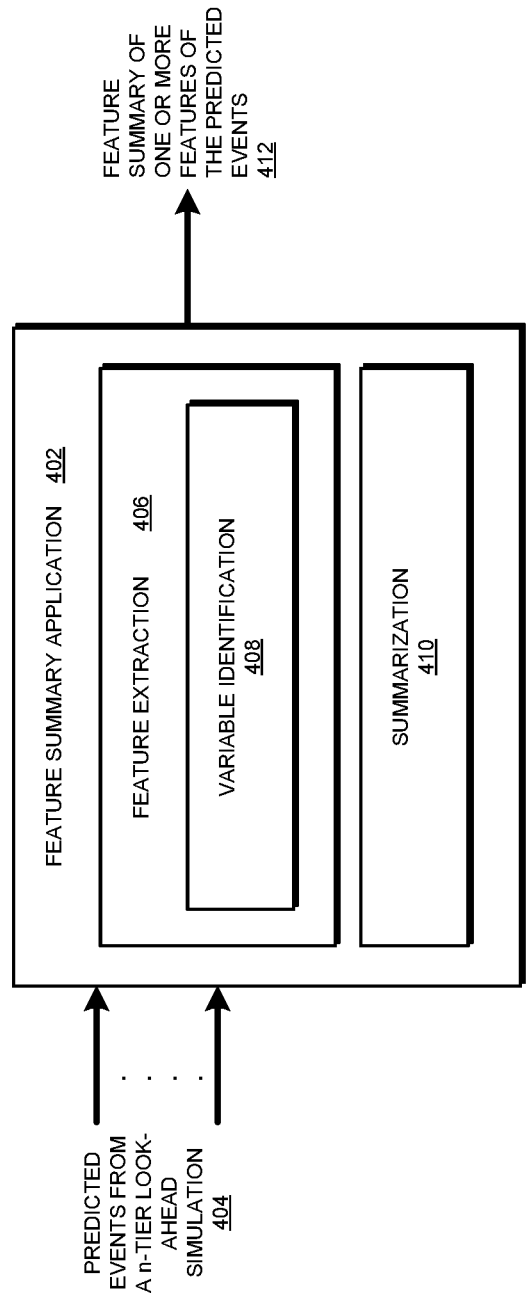
FIG. 4 depicts a block diagram of a portion of a process of adjusting cloud resource allocation using n-tier simulation in accordance with an illustrative embodiment.

With reference to FIG. 4, this figure depicts a block diagram of a portion of a process of adjusting cloud resource allocation using n-tier simulation in accordance with an illustrative embodiment. Feature summary application 402 is an example of feature summary application 111 in FIG. 1.

Feature summary application 402 receives as input predicted events 404 from an n-tier look-ahead simulation. Predicted events 404 can be all or a portion of set 322 in FIG. 3. Within the scope of the illustrative embodiments, under certain circumstances, predicted events 404 can be all or any portion of any of sets 314, 316, 318, 320, 322, or some combination thereof, as well.

Feature extraction component 406 identifies one or more features, on which some or all of predicted events 404 are dependent, by which some or all of predicted events are affected, or are by which some or all of predicted events are otherwise influenced. As a part of feature extraction in component 406, application 402 performs variable identification 408. Variable identification 408 identifies those variables in one or more features that describe certain aspects of the features, including but not limited to an aspect describing a component of a predicted event, an aspect describing a structure of the prediction tree formed by the sequence of predicted events at farther and farther look-ahead times, an aspect describing whether the feature is domain-dependent or domain-independent, and many other aspects. Other feature aspects and corresponding types of variables associated with the extracted features not described here are going to be apparent from this disclosure, and the same are contemplated within the scope of the illustrative embodiments.

Summarization component 410 prepares one or more feature summaries 412. A feature summary 412 summarizes the variables pertaining to a feature of predicted events 404.

Figure 5:
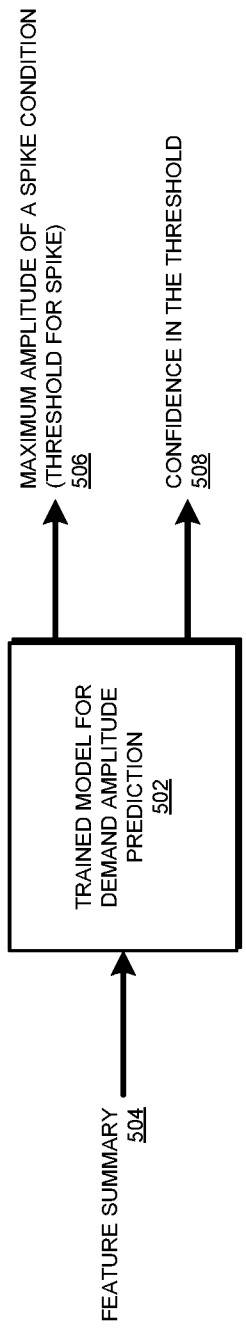
FIG. 5 depicts a block diagram of another portion of a process of adjusting cloud resource allocation using n-tier simulation in accordance with an illustrative embodiment.

With reference to FIG. 5, this figure depicts a block diagram of another portion of a process of adjusting cloud resource allocation using n-tier simulation in accordance with an illustrative embodiment. Trained model for demand amplitude prediction 502 is an example of spike prediction model 113 in FIG. 1, and may be executed using an instance of simulation tool 105 in FIG. 1.

Trained model 502 receives feature summary 504 as input. Feature summary 504 comprises one or more feature summaries from feature summaries 412 in FIG. 4. In the manner described with respect to an embodiment elsewhere in this disclosure, trained model 502 produces output 506. Output 506 is a maximum amplitude of a spike condition, in other words, a spike threshold.

In one embodiment, trained model 502 also produces output 508. Output 508 is a confidence level in the spike threshold as described elsewhere in this disclosure.

Figure 6:
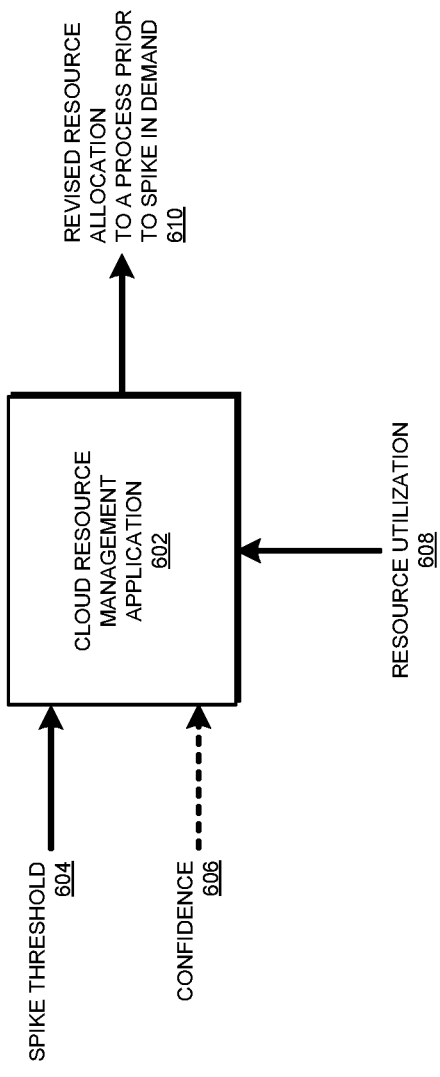
FIG. 6 depicts a block diagram of another portion of a process of adjusting cloud resource allocation using n-tier simulation in accordance with an illustrative embodiment.

With reference to FIG. 6, this figure depicts a block diagram of another portion of a process of adjusting cloud resource allocation using n-tier simulation in accordance with an illustrative embodiment. Cloud resource management application 602 is an example of provisioning application 115 in FIG. 1.

Application 602 receives as input spike threshold 604. Spike threshold 604 is output 506 in FIG. 5. Optionally, application 602 also receives as additional input 606 the confidence in spike threshold 604. Confidence 606 is output 508 in FIG. 5.

Application 602 continuously, periodically, or on demand, receives resource utilization 608 of the process for which demand fluctuations have to be proactively managed. Application 602 analyzes resource utilization 608 to detect utilization levels comparable to spike threshold 604. When resource utilization 608 reaches spike threshold 604, application 602 determines that a spike or unforeseen increase in resource demand from the process is impending. Accordingly, application 602 outputs or causes to be produced, adjusted or revised resource allocation 610 to the process prior to the occurrence of the spike.

Optionally, when confidence 606 is also available to application 602, application 602 employs additional logic or selectivity. When resource utilization 608 reaches spike threshold 604, application 602 determines that a spike or unforeseen increase in resource demand from the process is impending. Application 602 further determines whether confidence 606 meets or exceeds a predetermined confidence level. If confidence 606 meets or exceeds the predetermined confidence level, application 602 outputs or causes to be produced, adjusted or revised resource allocation 610 to the process prior to the occurrence of the spike. Additional confidence-level based selectivity in revising a resource allocation can be used to tune any resource allocation adjustments that occur too early or too late relative to the actual spike.

Figure 7:
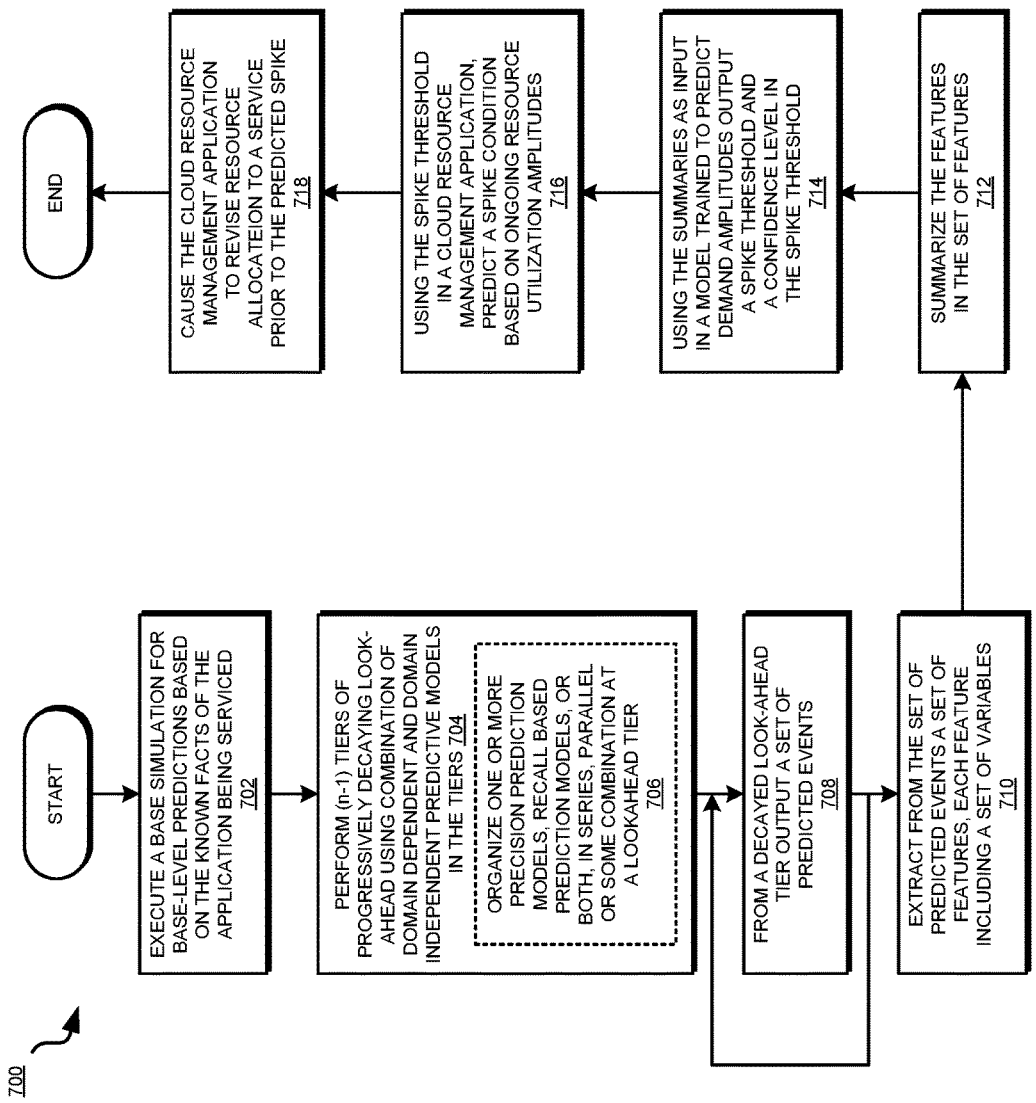
FIG. 7 depicts a flowchart of an example process of adjusting cloud resource allocation using n-tier simulation in accordance with an illustrative embodiment.

With reference to FIG. 7, this figure depicts a flowchart of an example process of adjusting cloud resource allocation using n-tier simulation in accordance with an illustrative embodiment. Process 700 can be implemented in application 103 in FIG. 1.

The application executes, or causes to be executed, a base simulation using the known facts of the application or process being serviced by the cloud (block 702). The application performs, or causes to be performed, (n−1) additional tiers of progressively decaying look-ahead using a combination of domain-dependent and domain-independent predictive models in the additional tiers (block 704).

The farther a tier's look-ahead into the process' future, the more the uncertainty in the start and end times of the predicted events. This increasing uncertainty from one tier to the next is called decay. An event predicted in m-th tier is more decayed compared to a comparable event predicted in (m−1)th tier, which in turn is more decayed compared to a comparable event predicted in (m−2)th tier, and so on. In other words, if a predicted event from a tier is regarded as a waypoint between tiers, the waypoint's value is fuzzy due to the uncertainty in the times associated with the waypoint. The waypoint becomes fuzzier after the next tier in a longer term look-ahead due to the increase in the uncertainty.

In performing, or causing to be performed, the tiers of block 704, the application organizes, or causes to be organized, precision-oriented, recall-oriented predictive models, or some combination thereof, in series, parallel, or a combination of series and parallel configuration in the additional tiers (block 706).

From a look-ahead tier, the application outputs, or causes to be output, a set of predicted events (block 708). The application progressively moves through the look-ahead tiers producing such sets of increasingly decaying predicted events sets.

The application extracts, or causes to be extracted, from a set of predicted events, such as from the set of n-th level predicted events, a set of features (block 710). Each feature includes a set of variables.

The application summarizes, or causes to be summarized, all or some of the features in the set of features extracted in block 710 (block 712). Using the one or more summaries created in block 712 as an input, the application causes a model trained for predicting demand amplitudes to output a spike threshold (block 714). The application optionally causes the trained model to also output a confidence level corresponding to the spike threshold in block 714.

The application causes the spike threshold to be used as an input in a cloud resource management application to predict a spike condition in the future based on ongoing resource utilization amplitudes (block 716). The application causes the cloud resource management application to revise the resource allocation to a resource consumer service or process prior to the predicted spike (block 718). The application ends process 700 thereafter.

Thus, a computer implemented method, system, and computer program product are provided in the illustrative embodiments for adjusting cloud resource allocation using n-tier simulation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
executing, in a multi-tiered simulation configuration, a combination of predictive models such that each tier in the multi-tiered simulation configuration executes at least one predictive model to produce a corresponding set of predicted events, wherein a predicted event from a first tier in the configuration forms an input to a next tier in the configuration;
configuring the multi-tiered simulated configuration such that a starting time of a predicted event from the next tier has a greater uncertainty than a starting time of the predicted event from the first set;
extracting, using a subset of a selected set of predicted events outputted from a corresponding selected tier in the multi-tiered simulation configuration, a set of features, each feature in the set of features having an effect on an outcome of the simulated process; and
using the set of features in a demand level prediction model to predict a threshold demand, wherein reaching the threshold demand in an actual utilization of a computing resource is indicative of a likelihood of an unforeseen rise in a demand for the computing resource after a period.

2. The method of claim 1, further comprising:
concluding, by evaluating the actual utilization of the computing resource relative to the demand threshold at a first time, that the unforeseen rise will occur after the period after the first time; and
causing, responsive to the concluding, an adjustment in an allocation of the computing resource to the process.

3. The method of claim 2, further comprising:
using the set of features in a demand level prediction model to output a confidence level corresponding to the threshold demand, wherein the confidence level is indicative of a probability that when the threshold demand is reached, the unforeseen rise in the demand will also occur; and
determining whether the confidence level at least equals a predetermined level, wherein the concluding and the causing are responsive to the confidence level at least equaling the predetermined level.

4. The method of claim 1, further comprising:
executing in one tier in the multi-tiered simulation configuration a domain-dependent predictive model that is trained using state information of a process being simulated.

5. The method of claim 1, further comprising:
executing in one tier in the multi-tiered simulation configuration a domain-independent predictive model that is trained using state information of a process not being simulated.

6. The method of claim 1, further comprising:
configuring one tier in the multi-tiered simulation configuration as a recall-oriented tier to execute at least one recall-oriented predictive model.

7. The method of claim 1, further comprising:
configuring one tier in the multi-tiered simulation configuration as a precision-oriented tier to execute at least one prediction-oriented predictive model.

8. The method of claim 1, further comprising:
executing in one tier in the multi-tiered simulation configuration at least one recall-oriented prediction model and at least one precision-oriented predictive model in one of (i) a series, (ii) parallel, and (iii) a combination of series and parallel.

9. The method of claim 1, further comprising:
identifying a variable of a feature in the set of features, wherein the variable described a component of a predicted event in the subset of a selected set of predicted events.

10. The method of claim 1, further comprising:
summarizing the set of features to form a feature summary, wherein the using the set of features in the demand level prediction model comprises using the feature summary in the demand level prediction model.

11. The method of claim 1, further comprising:
executing a base simulation prior to a first tier in the multi-tiered simulation configuration, wherein the base simulation uses a known fact of the simulated process as input.

12. The method of claim 1, wherein the method is embodied in a computer program product comprising one or more computer-readable tangible storage devices and computer-readable program instructions which are stored on the one or more computer-readable tangible storage devices and executed by one or more processors.

13. The method of claim 1, wherein the method is embodied in a computer system comprising one or more processors, one or more computer-readable memories, one or more computer-readable tangible storage devices and program instructions which are stored on the one or more computer-readable tangible storage devices for execution by the one or more processors via the one or more memories and executed by the one or more processors.

14. A computer program product for adjusting resource allocation in a cloud computing environment, the computer program product comprising
one or more computer-readable tangible storage devices; and
program instructions, stored on at least one of the one or more storage devices, comprising:
program code to execute, in a multi-tiered simulation configuration, a combination of predictive models such that each tier in the multi-tiered simulation configuration executes at least one predictive model to produce a corresponding set of predicted events, wherein a predicted event from a first tier in the configuration forms an input to a next tier in the configuration;
program code to configure the multi-tiered simulated configuration such that a starting time of a predicted event from the next tier has a greater uncertainty than a starting time of the predicted event from the first set;
program code to extract, using a subset of a selected set of predicted events outputted from a corresponding selected tier in the multi-tiered simulation configuration, a set of features, each feature in the set of features having an effect on an outcome of the simulated process; and
program code to use the set of features in a demand level prediction model to predict a threshold demand, wherein reaching the threshold demand in an actual utilization of a computing resource is indicative of a likelihood of an unforeseen rise in a demand for the computing resource after a period.

15. The computer program product of claim 14, further comprising:
program code to conclude, by evaluating the actual utilization of the computing resource relative to the demand threshold at a first time, that the unforeseen rise will occur after the period after the first time; and
program code to cause, responsive to the concluding, an adjustment in an allocation of the computing resource to the process.

16. The computer program product of claim 14, further comprising:
program code to use the set of features in a demand level prediction model to output a confidence level corresponding to the threshold demand, wherein the confidence level is indicative of a probability that when the threshold demand is reached, the unforeseen rise in the demand will also occur; and
program code to determine whether the confidence level at least equals a predetermined level, wherein the concluding and the causing are responsive to the confidence level at least equaling the predetermined level.

17. The computer program product of claim 13, further comprising:
program code to execute in one tier in the multi-tiered simulation configuration a domain-dependent predictive model that is trained using state information of a process being simulated.

18. A computer system for adjusting resource allocation in a cloud computing environment, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to execute, in a multi-tiered simulation configuration, a combination of predictive models such that each tier in the multi-tiered simulation configuration executes at least one predictive model to produce a corresponding set of predicted events, wherein a predicted event from a first tier in the configuration forms an input to a next tier in the configuration;
program instructions, stored on at least one of the one or more storage devices for execution by at least one of the one or more processors via at least one of the one or more memories, to configure the multi-tiered simulated configuration such that a starting time of a predicted event from the next tier has a greater uncertainty than a starting time of the predicted event from the first set;

program instructions, stored on at least one of the one or more storage devices for execution by at least one of the one or more processors via at least one of the one or more memories, to extract, using a subset of a selected set of predicted events outputted from a corresponding selected tier in the multi-tiered simulation configuration, a set of features, each feature in the set of features having an effect on an outcome of the simulated process; and program instructions, stored on at least one of the one or more storage devices for execution by at least one of the one or more processors via at least one of the one or more memories, to use the set of features in a demand level prediction model to predict a threshold demand, wherein reaching the threshold demand in an actual utilization of the computing resource is indicative of a likelihood of an unforeseen rise in a demand for the computing resource after a period.

* * * * *